Figure 1:
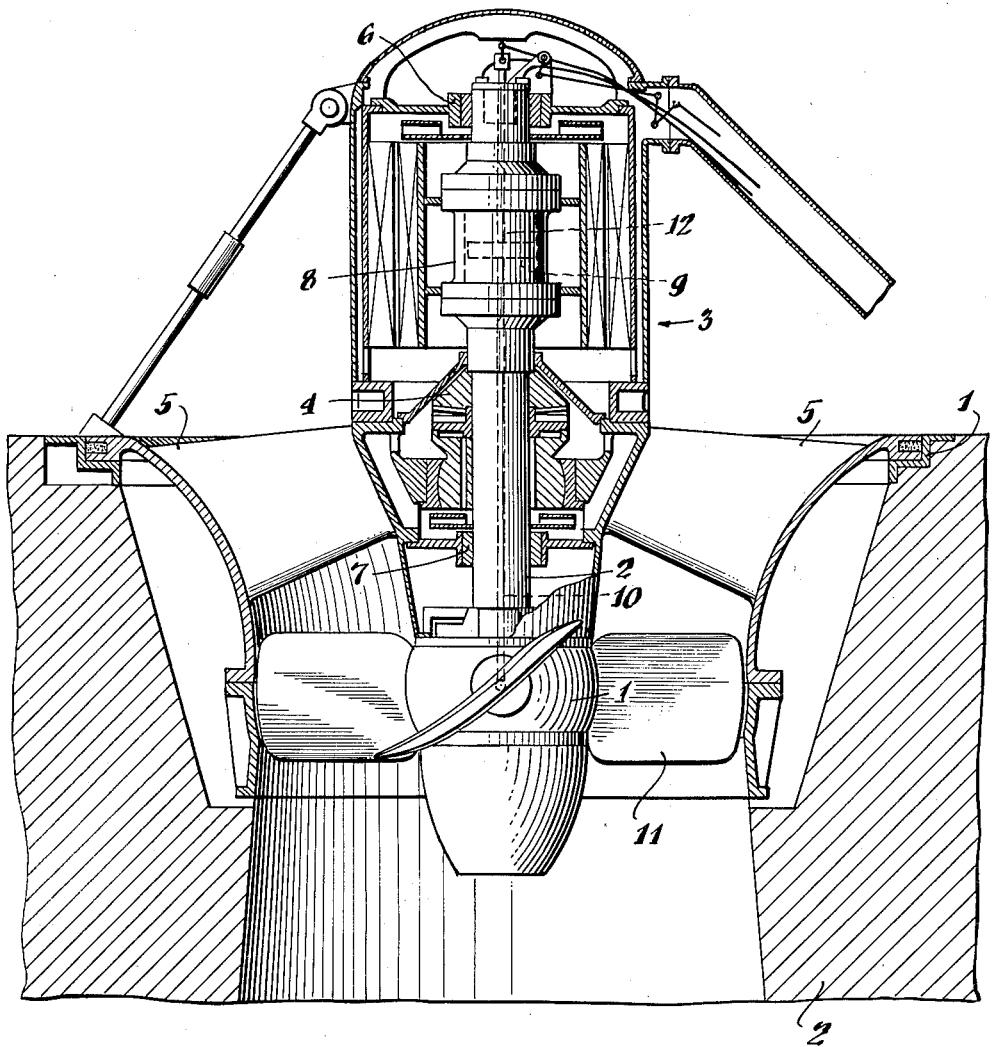

Jan. 24, 1956     H. PEYRIN ET AL     2,731,951
FLUID TRANSFER CONNECTION BETWEEN A FIXED
FLUID CONDUIT AND A ROTATING CYLINDER
Filed July 19, 1951     2 Sheets-Sheet 1

INVENTORS
Henri Peyrin
BY Severin Xavier Casacci

George W. Corey
ATTORNEY

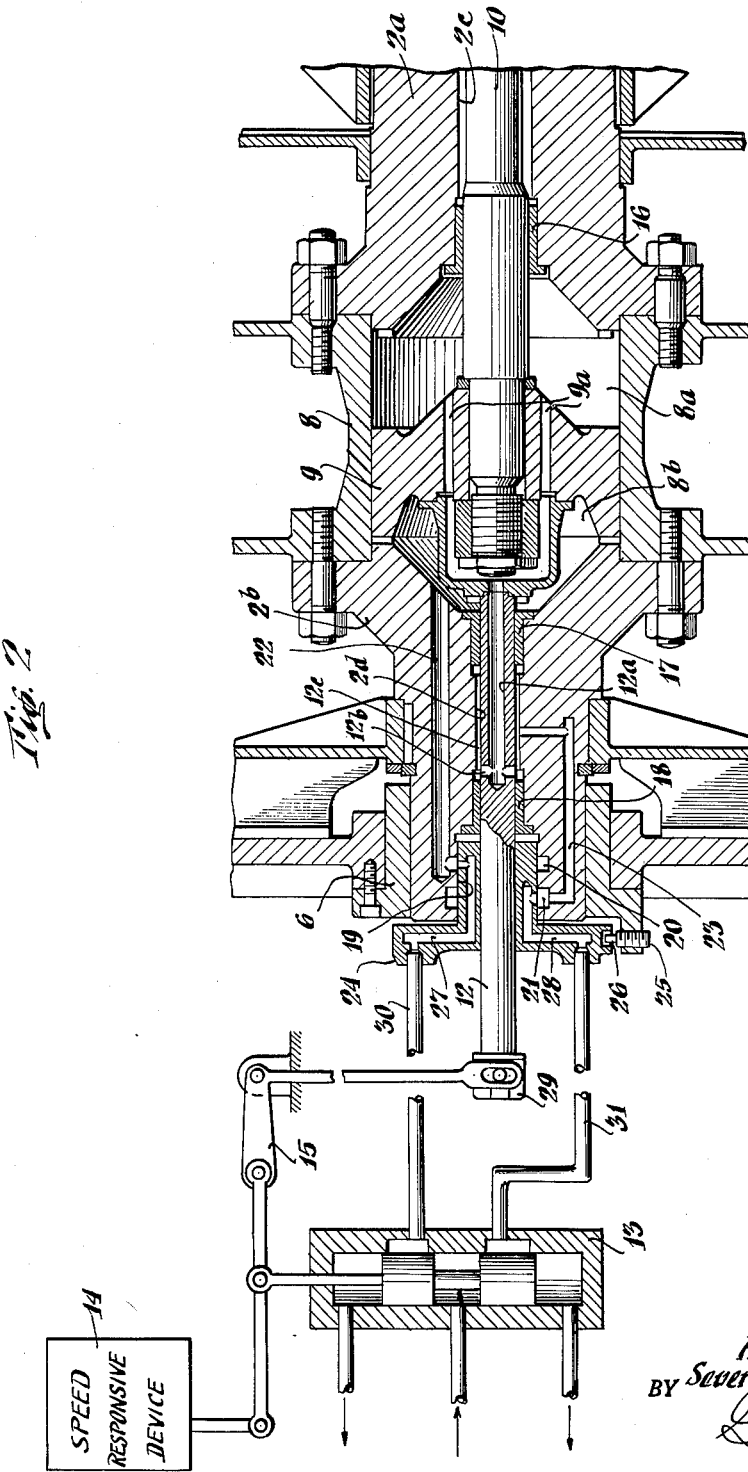

United States Patent Office 2,731,951
Patented Jan. 24, 1956

2,731,951

FLUID TRANSFER CONNECTION BETWEEN A FIXED FLUID CONDUIT AND A ROTATING CYLINDER

Henri Peyrin and Severin Xavier Casacci, Grenoble, France, assignors to Etablissements Neyrpic, Grenoble, France, a corporation of France Application July 19, 1951, Serial No. 237,632

Claims priority, application France July 25, 1950

6 Claims. (Cl. 121—38)

The present invention relates to couplings for transferring fluid between relatively moving parts, particularly couplings for supplying fluid to a servomotor mounted within a rotating element.

In certain types of rotating machines, it is sometimes desired to provide a servomotor located within a rotating part. Several types of couplings have been proposed for transferring the motive fluid to the servomotor from a control valve which is stationary and located outside the rotating part. Such couplings commonly use a fixed casing having one wall closed by part of the rotating shaft, with two chambers within the casing, each corresponding to one of the opposed expansible chambers of the servomotor. These two chambers are in fluid communication with conduits located within the shaft of the rotating machine and conducting the fluid to the servomotor. This fixed casing may be placed in immediate proximity to the end of the rotating shaft. In such a case, the fluid passing to and from the servomotor may be conducted through two concentric tubes located at the center of the shaft and turning with it. The casing may alternatively be placed outside the shaft and is then called a distributing ring. In the latter case each of the two chambers has the form of an annular groove, communicating permanently with two conduits opening into the servomotor, these conduits being bored or otherwise suitably fashioned through the shaft. In other cases, the distributor valve itself is within the shaft and in such cases requires a different type of coupling for the admission of the motive fluid. In the latter arrangement, a substantial space within the rotating parts is required, which results in an increase in size, often detrimental to the outside contour of the machine, and unsuitable for use where such contours must be designed in a convenient manner for the operation of a machine.

An object of the present invention is to provide an improved coupling for transferring fluid to a servomotor located within a rotating part.

In carrying out the invention, the passages for admitting and draining fluid from the servomotor are located within the interior of the shaft which carries the servomotor. One of these passages cooperates with a passage bored through a rod attached to the piston of the servomotor, and which may be the piston rod. This passage opens at one face of the piston.

In this arrangement, the coupling for supplying fluid occupies a small space within the end of the shaft of the rotating machine. This coupling is of small size, and puts no mechanical limitations on the structure adjacent the servomotor, so that the space there may be used for the installation of active parts. The resulting structure is simple, convenient and inexpensive.

Rotating servomotors are commonly located within a shaft which encloses the servomotor cylinder on all sides. The shaft is commonly supported by bearings. In utilizing the end of the shaft for the admission of fluid to the servomotor in accordance with the invention, the interior of the shaft is used without encumbering the outer surface of the shaft, which is an especially desirable construction at the place where the shaft is seated within its bearing.

The invention will be more completely described by reference to the accompanying drawings which illustrate, by way of example, one embodiment of the invention as applied to a servomotor which controls the pitch of the turbine vanes in a hydro-electric unit. In the drawings Fig. 1 is an assembly drawing, partly in section and partly in elevation, showing a hydraulic turbine and generator unit provided with a servomotor and a fluid coupling therefor in accordance with the present invention.

Fig. 2 is a sectional view taken along the axis of the shaft of the unit of Fig. 1, showing the servomotor and its fluid couplings in detail.

Referring to Fig. 1 there is shown a turbine and generator unit including a turbine 1 fixed on a shaft 2 which also carries a generator 3. This unit is of the type shown and claimed in the copending application of Jean Claude Guimbal, Serial No. 193,851, filed Nov. 3, 1950 now Patent No. 2,634,375. The shaft 2 is supported on a thrust bearing 4 and is provided with guide bearings 6 and 7.

The shaft 2 is hollow throughout its length and is provided wtihin the generator 3 with an enlarged cylindrical section 8, which serves as a cylinder for a servomotor piston 9. This piston 9 is connected through a piston rod 10 to suitable mechanism (not shown) for changing the pitch of the vanes 11 of the turbine 1. The piston 9 is also connected to another piston rod 12, extending upwardly as viewed in Fig. 1, which operates, through suitable linkage shown diagrammatically, a restoring mechanism for a distributor valve 13 (Fig. 2) which controls the supply of fluid to the servomotor formed by piston 9 and cylinder 8.

The distributor valve 13 is of conventional form, and is controlled by a speed responsive device indicated diagrammatically at 14 and by the restoring linkage operated by the piston rod 12, which linkage, as shown in Fig. 2, includes a bell crank lever 15.

Referring now to Fig. 2, in which the servomotor and its fluid connections are shown in more detail, it may be seen that this part of the shaft of the unit is constructed in three sections, namely the cylindrical section 8 which serves as the cylinder of the servomotor and head sections 2a and 2b, which serve as heads for the servomotor cylinder. The head 2a is provided with an axial bore 2c, in which the piston rod 10 moves. The head section 2b of the shaft is provided with an axial bore 2d which receives the piston rod 12.

The piston 9 separates two chambers 8a and 8b within the cylinder 8. The chambers 8a and 8b are sealed at their ends by packing glands 16 and 17.

The piston 9 is provided with passages 9a extending between its faces and opening at their right ends, as seen in the drawing, into the chamber 8a of the servomotor. These passages 9a are in fluid communication with an axial bore 12a in the piston rod 12. The opposite end of the bore 12a communicates through a cross bore 12b with an annular space 12c between the piston rod 12, the head 2b, the packing gland 17 and another packing gland 18. In the end of the shaft section 2b is provided a cylindrical recess 19, and in the wall of that recess are machined two annular grooves 20 and 21. The groove 20 is connected to the chamber 8b through a passage 22 bored in the shaft section 2b. The groove 21 communicates with a passage 23 which opens at its opposite end into the space 12c. The passages 22 and 23 are formed by drilling through the shaft section 2b.

A coupling member 24 is inserted in the recess 19, and encircles the piston rod 12. The coupling member 24 is provided with a loose mechanical connection to a stationary part of the machine. In the construction shown, this loose mechanical connection includes a pin 25 threaded into an extension of the bearing 6 and projecting within a recess 26 formed in the coupling member 24. The recess 26 is made slightly larger than the end of pin 25. The clearances provided between the bearing 6 and the shaft section 2b may be typical bearing clearances. The coupling member 24 may be provided with a substantially closer fit in the recess 19, since the coupling member is not required to take any lateral forces. The coupling member 24 may move laterally with the shaft 2b within the limits of movement determined by the clearance of the bearing 6. The coupling member 24 cannot transmit any force between the shaft section 2b and the stationary parts, since the loose mechanical connection including pin 25 and recess 26 is not capable of transmitting any substantial force. This connection is nevertheless effective to hold the coupling member 24 against rotation.

The coupling member 24 is provided with passages 27 and 28 communicating respectively with the grooves 20 and 21.

The piston rod 12 is provided at its end with a collar 29 cooperating with a yoke on the end of one arm of the bell crank lever 15. The connection between the piston rod 12 and the bell crank lever 15 is shown merely by way of example. Any suitable connection may be used, and any appropriate linkage or other apparatus may be used to connect the piston rod to the distributor valve 13 which controls the servo motor.

The passages 27 and 28 in the coupling member 24 communicate with flexible conduits 30 and 31, respectively, which receive fluid from the distributor valve 13. The distributor valve 13 is usually located remote from the servomotor. For example, when the turbine and generator assembly is submerged, which is the intended mode of operation of the unit shown in Fig. 1, the distributor valve is located above the dam or within the control room, where it is protected from the water.

When the piston 9 is to be moved to the right as it appears in Fig. 2, oil under pressure is admitted through the conduit 30, it flows through passage 27, groove 20 and passage 22 to the interior of chamber 8b, where it acts on the piston 9 so as to push it toward the right, as it appears in the drawing, moving with it the piston rods 10 and 12. The fluid which is in contact with the opposite face of the piston is drained through passages 9a and 12a, 12b and 12c, passage 23, groove 21, passage 28 and conduit 31 to the distributor valve 13.

When the piston 9 is to be moved in the opposite sense to that described above, that is, to the left as it appears in the drawing, the motive fluid is admitted through the conduit 31 and drained through the conduit 39, the process being the reverse of that described above.

The operation of the distributor valve is entirely conventional and will not be further described. The particular distributor valve illustrated is shown merely by way of example.

The operation of the servomotor in a satisfactory manner is assured regardless of the rotation of the shaft 2. The coupling member 24 is inserted within the recess 19 with a tolerance determined by the requirement for limiting the leakage of the motive fluid, usually oil, to a minimum value. This is to be contrasted to other arrangements previously known, in which the fluid coupling member is subject to substantial bearing stresses, and in which the clearances must be determined in accordance with the bearing functions of the parts rather than with a view to limiting the leakage to a minimum.

The arrangement shown and described provides a very compact structure, in which the rotating parts are only very slightly encumbered by fluid couplings for the servo motor. This construction also permits the reduction of leakage at the coupling to a minimum by means of simple structures, and without increasing the size of the rotating shaft. The arrangement presents an appreciable advantage in reducing the dimensions and the weight of a hydraulic turbine to which it is applied.

We claim:

1. A coupling for transferring fluid, comprising a fixed conduit for said fluid, a rotatable member having a passage for said fluid, a coupling member, one of said members having a cylindrical recess to rotatably receive a cylindrical projection on the other member, said recess and projection being concentric with the axis of rotation of said rotatable member, one of said members having a groove therein concentric with said axis and covered by the other member, said coupling member having a fluid passage extending therethrough, the two ends of said passage being in fluid communication with said fixed conduit and said groove respectively, stationary bearing means encircling said rotatable member with a radial clearance relatively large as compared to the radial clearance between said rotatable member and said coupling member, and a projection on said stationary bearing means, said projection extending radially inward, said coupling member having an aperture larger than said projection for receiving the same, said projection and said aperture cooperating to fix said coupling member against rotation while permitting said coupling member to move relative to said bearing means throughout the range permitted by said clearances so that substantially no stress can be transmitted between said rotatable member and said fixed member, through said coupling member.

2. A fluid motor comprising a cylinder, a piston slidable within said cylinder, a pair of heads closing the ends of the cylinder, means supporting said cylinder and heads for rotation as a unit about the axis of the cylinder, a piston rod attached to said piston, one of said heads having an axial bore therein receiving said piston rod and a first passage providing fluid communication with the end of the cylinder nearest said one head, said one head having a second passage therein, means including said second passage providing fluid communication with the end of the cylinder farthest from said one head, a pair of fixed fluid conduits, a coupling member having an axial bore slidably and rotatably receiving said piston rod, said one head and said coupling member having cooperating mating surfaces concentric with said bores and a pair of grooves in one of said surfaces, said grooves being concentric with said bores, said first and second passages in said one head respectively opening into said grooves, said coupling member having a pair of fluid passages extending therethrough, each opening at one end into one of said fixed conduits and at its other end into one of said grooves, a fixed member, and a loose mechanical connection between said fixed member and said coupling member to hold said coupling member against rotation while permitting said coupling member to move relative to said fixed member throughout a limited range so that substantially no stress can be transmitted between said rotatable member and said fixed member through said coupling member.

3. A fluid motor comprising a cylinder, a piston slidable within said cylinder, a pair of heads closing the ends of the cylinder, means supporting said cylinder and heads for rotation as a unit about the axis of the cylinder, a piston rod attached to said piston, one of said heads having an axial bore therein for receiving said piston rod and a first passage providing fluid communication with the end of the cylinder nearest said one head, said piston and said piston rod having communicating passages providing fluid communication with the end of the cylinder farthest from said one head, said piston rod being capable of limited sliding movement through said bore, said axial bore having a larger cross section than said piston rod so as to provide substantial clearance between said piston rod and the walls of the bore, sealing members at the ends of said bore closely engaging the walls of said bore and the exterior surface of said piston rod so as to seal the ends of the bore, said sealing members cooperating with said piston rod and said one head to define a peripheral space around said piston rod within said bore, said piston rod passage opening into said space, said one head having a second passage opening into said space so that fluid may be transferred through said space between said piston rod passage and said second head passage through said space, a pair of fixed fluid conduits, and means providing fluid communication between the respective fixed fluid conduits and said first and second passages.

4. A fluid motor comprising a cylinder, a piston slidable within said cylinder, a pair of heads closing the ends of the cylinder, means supporting said cylinder and heads for rotation as a unit about the axis of the cylinder, a piston rod attached to said piston, one of said heads having an axial bore therein for receiving said piston rod and a first passage providing fluid communication with the end of the cylinder nearest said one head, said piston and said piston rod having communicating passages providing fluid communication with the end of the cylinder farthest from said one head, said piston rod being capable of limited sliding movement through said bore, said axial bore having a larger cross section than said piston rod so as to provide substantial clearance between said piston rod and the walls of the bore, sealing members at the ends of said bore closely engaging the walls of said bore and the exterior surface of said piston rod so as to seal the ends of the bore, said sealing members cooperating with said piston rod and said one head to define space around said piston rod within said bore, said piston rod passage opening into said space, said one head having a second passage opening into said space so that fluid may be transferred through said space between said piston rod passage and said second head passage, a pair of fixed fluid conduits, a coupling member having an aixal bore for slidably and rotatably receiving said piston rod, said one head and said coupling member having cooperating mating surfaces concentric with said axial bores, and a pair of grooves in one of said cooperating surfaces, said grooves being concentric with said bores, said first and second passages in said one head respectively opening into said grooves, said coupling member having a pair of fluid passages extending therethrough, each opening at one end into one of said fixed conduits and at its opposite ends into one of said grooves, said supporting means including stationary bearing means encircling said head with a clearance relatively large as compared to the clearance between said cooperating surfaces, a fixed member, and a loose mechanical connection between said fixed member and said coupling member to hold said coupling member against rotation while permitting said coupling member to move relative to said fixed member throughout the range permitted by said clearances so that substantially no stress can be transmitted between said one head and said fixed member through said coupling member.

5. A fluid motor comprising a rotatable cylinder, a piston slidable within said cylinder, a pair of heads rigidly connected to and closing the ends of said cylinder, each of said heads being adapted and bored to receive a piston rod extending from each side of said piston, one of said heads having its bore enlarged at that end removed from said piston, two concentric grooves located on the inside surface of said enlarged bore, a first conduit within and extending the length of said one head and in communication with said cylinder, said first conduit being in communication with that one of said grooves nearer said cylinder, fixed bearing means rotatably supporting said one head, and the coupling member inserted within said enlarged bore and having cooperating mating surfaces concentric with said bore and with the piston rod slidably extending therethrough, a second fluid conduit within said coupling member in communication with said nearer groove, a third fluid conduit within said coupling member in communication with the other of said grooves, a fourth fluid conduit within said one head and in communication at one end with the other groove, a fifth fluid conduit located axially within a portion of said piston rod in communication with the other side of said piston and with the other end of said fourth conduit, a slot machined into the outer surface of said coupling member, a pin rigidly fixed at one end to said bearing means and at the other end extending within said slot to make a loose mechanical connection between said bearing means and said coupling member, responsive means operatively connected to that end of said piston rod extending outside of said coupling member, and fluid supply conduits attached to each of said conduits located within said coupling member.

6. A coupling for transferring fluid, comprising a fixed conduit for said fluid, a rotatable member having a passage for said fluid, a coupling member, one of said members having a cylindrical recess to rotatably receive a cylindrical projection on the other member, said recess and projection being concentric with the axis of rotation of said rotatable member, one of said members having a groove therein concentric with said axis and covered by the other member, said coupling member having a fluid passage extending therethrough, the two ends of said passage being in fluid communication with said fixed conduit and said groove respectively, stationary bearing means encircling said rotatable member with a radial clearance relatively large as compared to the radial clearance between said rotatable member and said coupling member, and loose interlocking means extending between said stationary bearing means and said coupling member and cooperating to fix said coupling member against rotation while permitting said coupling member to move relative to said bearing means throughout the range permitted by said clearances so that substantially no stresses can be transmitted between said rotatable member and said bearing means through said coupling member.

References Cited in the file of this patent

UNITED STATES PATENTS

| | | |
|---|---|---|
| 420,209 | Nilson | Jan. 28, 1890 |
| 839,626 | Nielsen | Dec. 25, 1906 |
| 1,334,503 | Olson | Mar. 23, 1920 |
| 1,638,224 | Vandergrift | Aug. 9, 1927 |
| 1,656,149 | Hopkins | Jan. 10, 1928 |
| 2,244,770 | Englesson | June 10, 1941 |
| 2,420,626 | Stevenson | May 13, 1947 |
| 2,476,777 | Smith | July 19, 1949 |
| 2,558,990 | Stahl et al. | July 3, 1951 |
| 2,568,092 | Sloan et al. | Sept. 18, 1951 |
| 2,577,858 | Sampson | Dec. 11, 1951 |
| 2,584,747 | Sloan | Feb. 5, 1952 |